(12) United States Patent
Bassett

(10) Patent No.: US 7,264,102 B2
(45) Date of Patent: Sep. 4, 2007

(54) CLUTCH DRIVEN DISC WITH WAVE WASHER

(75) Inventor: Michael L. Bassett, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 200 days.

(21) Appl. No.: 11/133,600

(22) Filed: May 20, 2005

(65) Prior Publication Data

US 2006/0260900 A1    Nov. 23, 2006

(51) Int. Cl.
*F16D 13/68* (2006.01)
(52) U.S. Cl. .............................. 192/55.61; 192/70.17; 192/214.1
(58) Field of Classification Search ............... None
See application file for complete search history.

(56) References Cited

U.S. PATENT DOCUMENTS

| | | | |
|---|---|---|---|
| 2,733,797 A * | 2/1956 | Almen et al. ............ 192/107 R |
| 3,016,119 A * | 1/1962 | Rosenberger et al. .... 192/107 R |
| 4,657,124 A * | 4/1987 | Flotow ....................... 192/13 R |
| 4,697,682 A * | 10/1987 | Alas et al. ................ 464/68.41 |
| 5,511,640 A * | 4/1996 | Fukunaga ................. 192/70.17 |
| 5,634,540 A * | 6/1997 | Awaji et al. ................. 267/163 |
| 6,039,163 A | 3/2000 | Bassett et al. |
| 6,484,860 B1 | 11/2002 | Bassett |

* cited by examiner

*Primary Examiner*—Rodney H. Bonck
(74) *Attorney, Agent, or Firm*—Honigman Miller Schwartz and Cohn LLP

(57) ABSTRACT

A driven disc is provided that includes a hub assembly having an axis of rotation and a hub having at least one of a first radially extending projection and a first recess. The driven disc also includes a disc assembly having a disc plate rotatable relative to the hub and a wave washer positioned over the hub and between the hub assembly and the disc assembly. The wave washer includes at least one of a second recess and a second radially extending projection adapted to receive or to be received in the first radially extending projection or the first recess, respectively, to position the wave washer during assembly of the driven disc.

14 Claims, 4 Drawing Sheets

CLUTCH DRIVEN DISC WITH WAVE WASHER

BACKGROUND OF THE INVENTION

1. Field of the Invention

The present invention relates in general to a clutch driven disc for use in a friction torque device, such as a friction clutch, and to a clutch driven disc that includes a wave washer.

2. Description of the Related Art

The prior art is replete with friction clutches that employ one or more driven discs for transferring torque from an engine flywheel to a transmission input shaft. One such driven disc includes a hub assembly and a disc plate assembly that is rotatable relative to the hub assembly about a common axis of rotation. A wave washer is positioned between the disc assembly and the hub assembly to provide a spring force along the axis of rotation of the clutch driven disc. Clutch driven discs that include wave washers are notoriously difficult to assemble given the wave washer's undulated shape, which allows it to become eccentrically positioned relative to the hub axis. For at least this reason, an improved clutch driven disc design is desired that facilitates proper positioning of the wave washer during assembly.

SUMMARY OF THE INVENTION

A driven disc is provided that includes a hub assembly having an axis of rotation and a hub having at least one of a first radially extending projection and a first recess. The driven disc also includes a disc assembly having a disc plate rotatable relative to the hub and a wave washer positioned over the hub and between the hub assembly and the disc assembly. The wave washer includes at least one of a second recess and a second radially extending projection adapted to receive or to be received in the first radially extending projection or the first recess, respectively, to position the wave washer during assembly of the clutch driven disc. A friction torque device that includes a driven disc according to an embodiment of the present invention is also provided.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Figure 1:
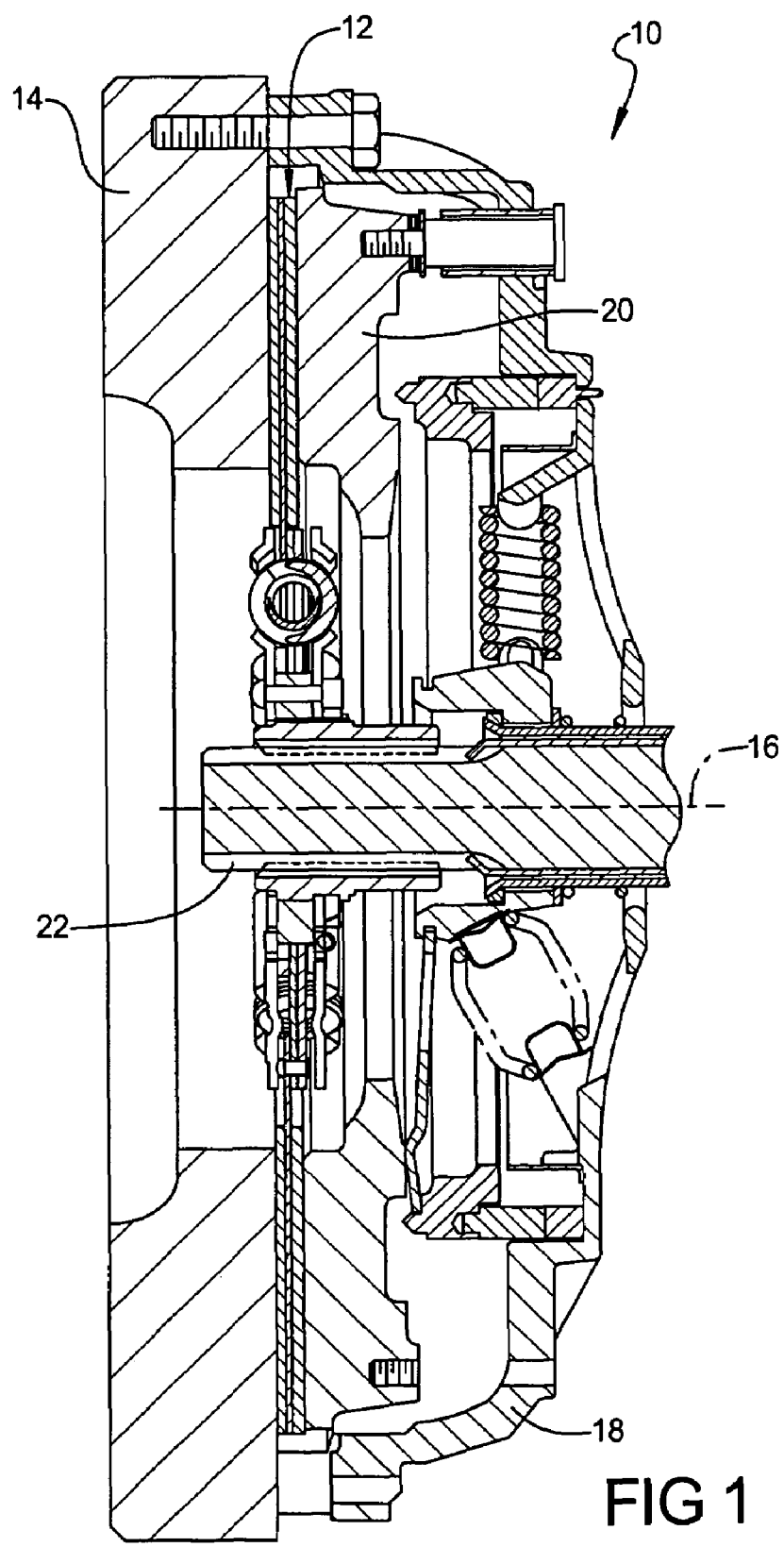
FIG. 1 is a cross-sectional view of an exemplary torque transmitting device that includes a driven disc according to an embodiment of the present invention.

FIG. 1 is a cross-sectional view of an exemplary torque transmitting device 10, such as a friction clutch, which includes a driven disc 12 and a driving member 14 having a common axis of rotation 16. A cover 18 is coupled to driving member 14 for rotation therewith. A pressure plate 20 is movably coupled to cover 18 for rotation therewith. Driven disc 12 is coupled to an axially extending driven shaft 22 for rotation therewith. Although driven disc 12 is shown splined to driven shaft 22, it will be appreciated that any suitable connecting interface may be used in lieu of a splined interface. Driven disc 12 is interposed between driving member 14 and pressure plate 20. The torque transmitting device configuration show in FIG. 1 is provided for environmental perspective only and is not intended to limit the scope of the present invention.

Figure 2:
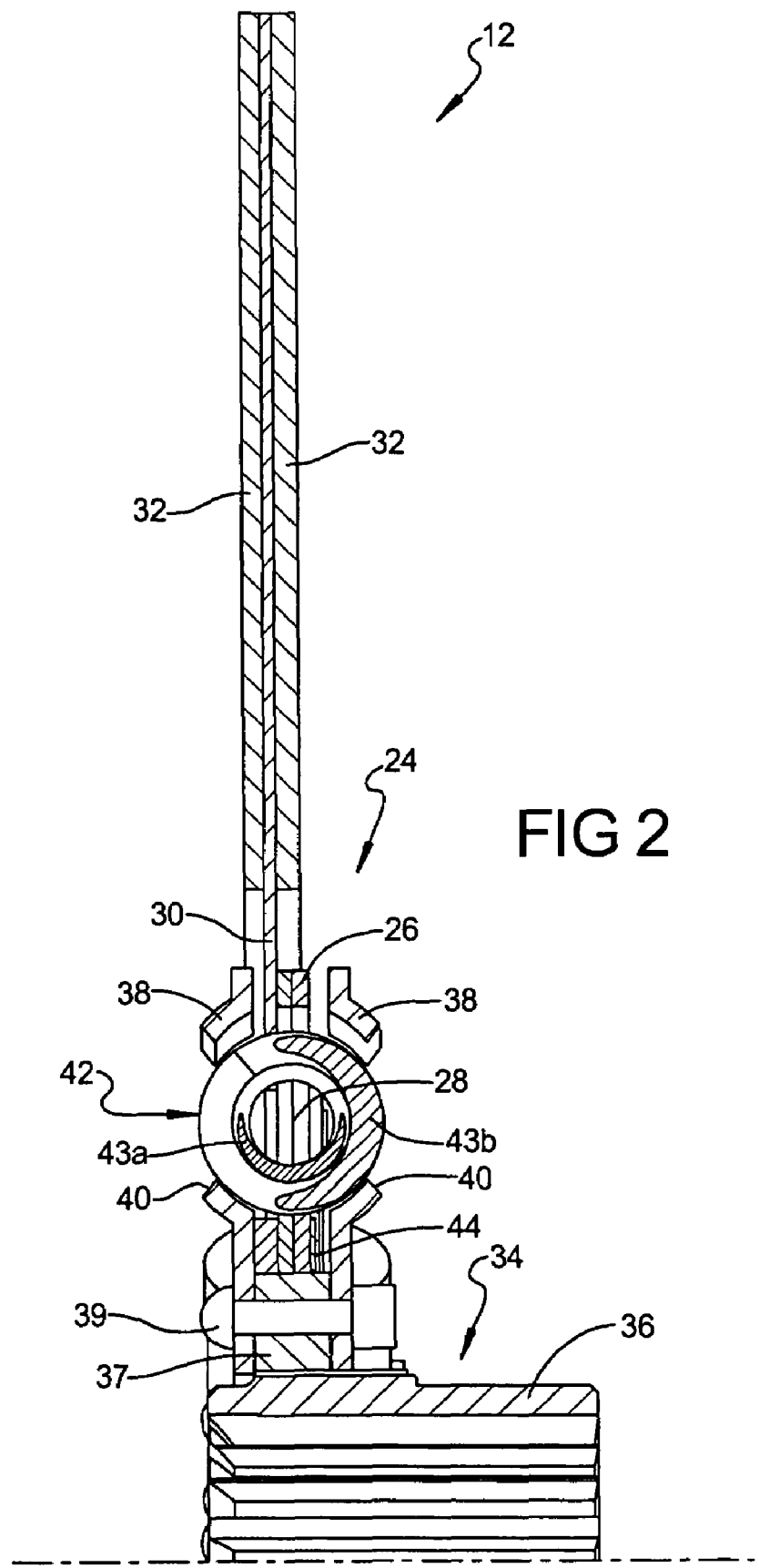
FIG. 2 is a cross-sectional view of a driven disc according to an embodiment of the present invention.
Figure 3:
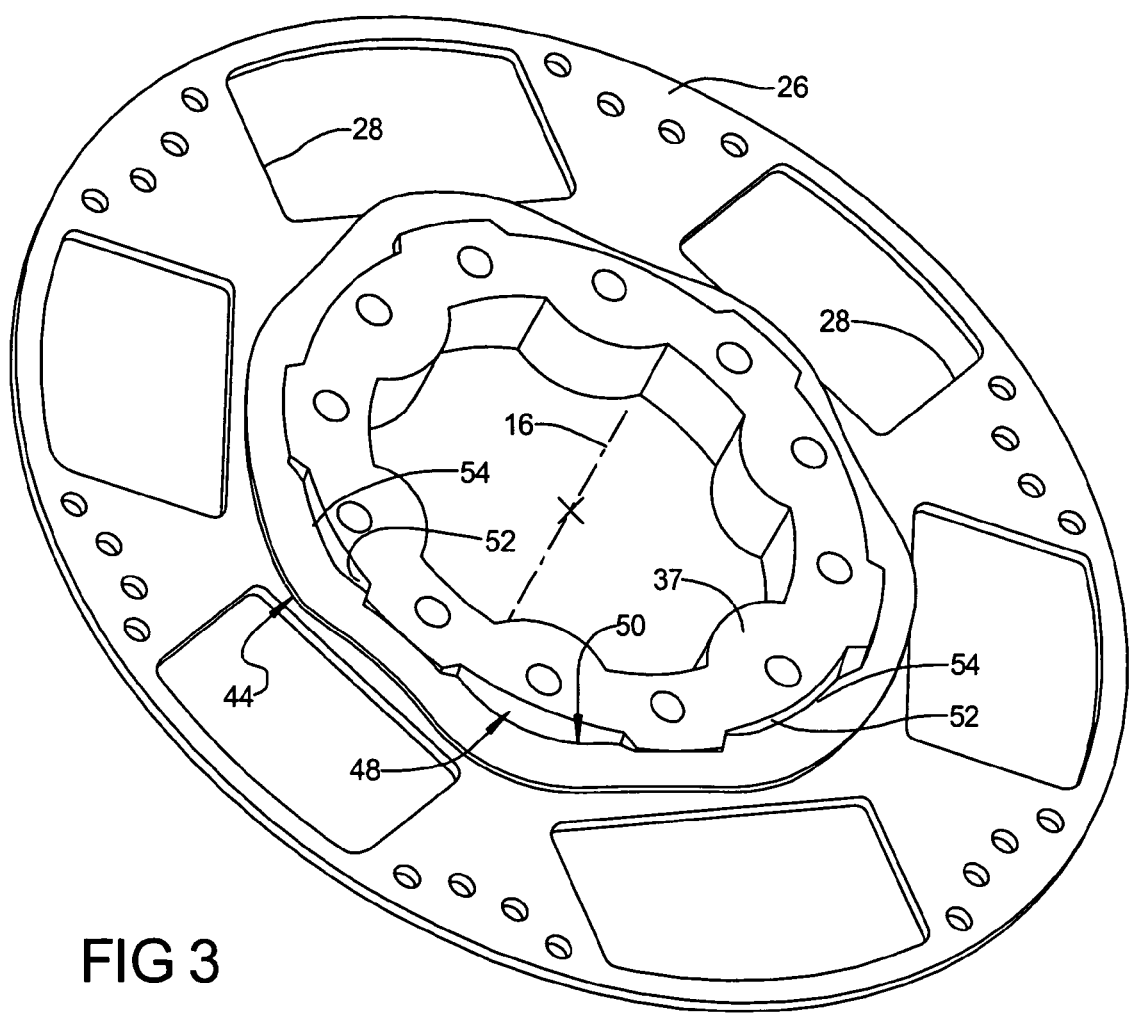
FIG. 3 is a perspective view of a driven disc hub, disc plate and wave washer according to an embodiment of the present invention.

Referring now to FIGS. 2 and 3, a driven disc 12 according to an embodiment of the present invention is shown in detail. In the illustrated embodiment, driven disc 12 includes a rotatable disc assembly 24 having at least one disc plate 26 with a plurality of apertures 28. By way of illustration, the disc assembly 24 shown in FIG. 2 includes two disc plates 26, but is not intended to be limited thereto. A carrier plate 30 is secured or connected to disc plate 26. A plurality of friction pads 32 are attached to carrier plate 30 for frictional engagement with pressure plate 20 and driving member 14 when a load is applied to pressure plate 20.

In an embodiment, driven disc 12 also includes a hub assembly 34 having an inner hub portion 36 secured or connected to an outer hub portion 37, although inner and outer hub portions 36, 37 may be made integral or otherwise form a single hub component. Outer hub portion 37 is secured or connected to at least one spring cover plate 38 using a number of fasteners 39. In the illustrated embodiment, hub assembly 34 includes a pair of spring cover plates 38, each having a plurality of apertures 40 that are at least partially aligned with apertures 28 in disc plate 26. A compliant member 42, such as a compression spring, is disposed within each of apertures 28, 40. In the illustrated configuration, compliant member 42 includes an inner coil spring 43a and an outer coil spring 43b. Disc assembly 24 is adapted to rotate relative to hub assembly 34, whereby torque spikes are dissipated in the form of heat resulting from friction as each coil spring 43a, 43b is compressed and then expand back to its initial state.

Figure 4:
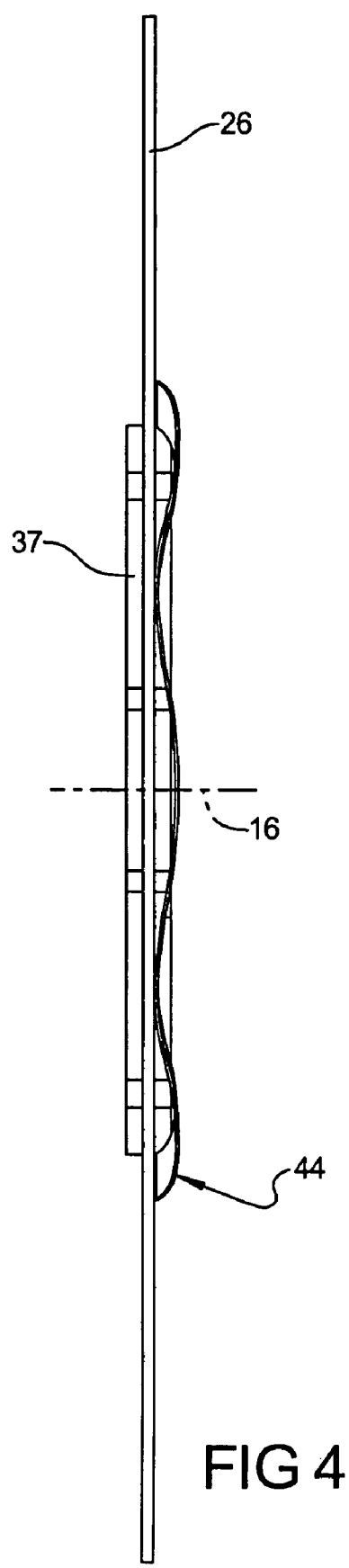
FIG. 4 is a side plan view of the driven disc hub, disc plate and wave washer according to an embodiment of the present invention.

In an embodiment, at least one wave washer 44 is disposed between disc plate 26 and spring cover plate 38. As shown in FIGS. 3 and 4, wave washer 44 includes a plurality of compressible undulations for providing a spring load between disk plate 26 and spring cover plate 38 along the axis of rotation 16. The undulations may form a continuous wave, as shown in FIG. 3, or may be segmented. With reference to FIG. 4, the peak of each undulation may extend slightly beyond the end of outer hub portion 37 during assembly, which, in the absence of the positioning features described below, would permit wave washer 44 to move relative to outer hub portion 37.

Accordingly, to ensure wave washer 44 is properly positioned during assembly, outer hub portion 37 includes a first spline 48 and wave washer 44 includes a second spline 50 adapted to mate with first spline 48, as shown in FIG. 3. In an embodiment, first spline 48 includes at least one recess 52 and second spline 50 includes at least one radially inwardly extending projection or tooth 54 adapted to be received in recess 52. Receipt of projection 54 into recess 52 helps to ensure that wave washer 44 is oriented in a predetermined positioned over outer hub portion 37 during assembly. In the illustrated embodiment, for example, first and second splines 48, 50 may be used to concentrically align wave washer 44 with the axis of rotation 16.

Projection 54 and recess 52 are not limited to the shape or configuration described above and illustrated in the FIGS. 3 and 4. For example, first spline 48 may include at least one radially outwardly extending projection or tooth adapted to be received in a corresponding recess of second spline 50. Furthermore, projection 54 and recess 52 are not limited to use in a "splined" interface, and may be used in other rotational coupling interfaces that are capable of transferring torque between two rotating components.

Torsional damping is achieved within the present invention by providing a rotationally compliant component and a hysteresis component. The rotationally compliant component has been previously described as compliant member 42 or, in the exemplary configuration, as inner and outer coil springs 43a, 43b. The hysteresis, or frictional component, is provided by the surface-to-surface coefficient of friction between disc assembly 24, hub assembly 34 and wave washer 44. As the load along the axis of rotation 16 increases between disc assembly 24, hub assembly 34 and wave washer 44, the resulting friction force is increased.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A driven disc, comprising:
  a hub assembly including
    an axis of rotation and
    a hub extending a first axial length and having at least one of
      a first radially extending projection and
      a first recess;
  a disc assembly including
    a disc plate rotatable relative to the hub, said axial length of said hub extending beyond said disc plate to define a first end of the hub; and
  a wave washer positioned over the hub and between the hub assembly and the disc assembly, the wave washer including at least one of
    a second recess and
    a second radially extending projection adapted to receive or to be received in the first radially extending projection or the first recess, respectively, to position the wave washer during assembly of the driven disc, wherein said second recess is axially located between an axial disposition of said disc plate and the first end of the hub.

2. The driven disc of claim 1, wherein the first radially extending projection or the first recess is a portion of a first radially outward extending spline and the second recess or the second radially extending projection is a portion of a second radially inward extending spline adapted to mate with the first spline.

3. The driven disc of claim 1, wherein the hub assembly includes a plurality of first radially extending projections or first recesses and the wave washer includes a plurality of second recesses or second radially extending projections adapted to receive or to be received in the first radially extending projections or the first recesses, respectively.

4. The driven disc of claim 1, wherein the wave washer includes a plurality of undulations.

5. The driven disc of claim 1, further including a compliant member disposed between the disc assembly and the hub assembly.

6. The driven disc of claim 1, wherein the disc assembly includes a friction pad.

7. A clutch driven disc, comprising:
  a hub assembly including
    an axis of rotation and
    a hub extending a first axial length and having a first spline;
  a disc assembly including
    a disc plate rotatable relative to the hub and at least one friction pad, said axial length of said hub extending beyond said disc plate to define a first end of the hub;
  a compliant member disposed between the disc assembly and the hub assembly for absorbing torque as a function of relative rotation between the hub assembly and disc assembly; and
  a wave washer positioned over the hub between the hub assembly and the disc assembly, the wave washer including
    a second spline adapted to mate with the first spline to concentrically align the wave washer with the axis of rotation, wherein said wave washer is axially located between an axial disposition of said disc plate and the first end of the hub.

8. The clutch driven disc of claim 7, wherein the first spline is a radially outward extending spline and the second spline is a radially inward extending spline.

9. A friction torque device, comprising:
  a driving member;
  a cover secured to the driving member for rotation therewith;
  a pressure plate movably secured to the cover for rotation therewith; and
  a driven disc interposed between the driving member and the pressure plate, the driven disc including
    a hub assembly having an axis of rotation and
    a hub extending a first axial length and having
      at least one of a first radially extending projection and
      a first recess;
    a disc assembly including
      a disc plate rotatable relative to the hub, said axial length of said hub extending beyond said disc plate to define a first end of the hub; and
    a wave washer positioned over the hub and between the hub assembly and the disc assembly, the wave washer including
      at least one of a second recess and
      a second radially extending projection adapted to receive or to be received in the first radially extending projection or the first recess, respectively, to position the wave washer during assembly of the driven disc, wherein said second recess is axially located between an axial disposition of said disc plate and the first end of the hub.

10. The friction torque device of claim 9, wherein the first radially extending projection or the first recess is a portion of a first radially outward extending spline and the second recess or the second radially extending projection is a portion of a second radially inward extending spline adapted to mate with the first spline.

11. The friction torque device of claim 9, wherein the hub assembly includes a plurality of first radially extending projections or first recesses and the wave washer includes a plurality of second recesses or second radially extending projections adapted to receive or to be received in the first radially extending projections or the first recesses, respectively.

12. The friction torque device of claim 9, wherein the wave washer includes a plurality of undulations.

13. The friction torque device of claim 9, further including a compliant member disposed between the disc assembly and the hub assembly.

14. The friction torque device of claim 9, wherein the disc assembly includes a plurality of friction pads.

* * * * *